(12) United States Patent
Kim et al.

(10) Patent No.: US 8,120,800 B2
(45) Date of Patent: Feb. 21, 2012

(54) NETWORK PRINTER ADJUSTING THE NUMBER OF COPIES ON REQUEST FOR ADDITIONAL PRINTOUT AND NETWORK PRINT SYSTEM USING THE SAME

(75) Inventors: Han-sung Kim, Seoul (KR); Seong-il Park, Suwon-si (KR); Hyun-jung Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 945 days.

(21) Appl. No.: 11/333,338

(22) Filed: Jan. 18, 2006

(65) Prior Publication Data
US 2006/0164679 A1 Jul. 27, 2006

(30) Foreign Application Priority Data
Jan. 26, 2005 (KR) .......................... 10-2005-0007158

(51) Int. Cl.
G06F 3/12 (2006.01)
(52) U.S. Cl. ..................... 358/1.15; 358/1.13; 358/1.16; 709/205
(58) Field of Classification Search ................. 358/1.15, 358/1.13, 1.16; 709/205
See application file for complete search history.

(56) References Cited

U.S. PATENT DOCUMENTS

| | | | | |
|---|---|---|---|---|
| 5,652,830 A | * | 7/1997 | Yamamoto et al. | 358/1.16 |
| 6,377,977 B1 | * | 4/2002 | Sakata | 709/205 |
| 6,757,684 B2 | * | 6/2004 | Svendsen et al. | 1/1 |
| 7,106,472 B2 | * | 9/2006 | Gomez et al. | 358/1.15 |
| 2002/0057452 A1 | * | 5/2002 | Yoshino | 358/1.15 |
| 2002/0101600 A1 | * | 8/2002 | Sabbagh et al. | 358/1.13 |
| 2003/0011803 A1 | * | 1/2003 | Peter et al. | 358/1.14 |
| 2003/0011813 A1 | * | 1/2003 | Peter et al. | 358/1.15 |

FOREIGN PATENT DOCUMENTS

| | | |
|---|---|---|
| JP | 09-282115 | 10/1997 |
| JP | 08-286853 | 11/1997 |
| JP | 11-316660 | 11/1999 |
| JP | 2000-194521 | 7/2000 |
| KR | 2000-0032921 | 6/2000 |

* cited by examiner

*Primary Examiner* — Benny Tieu
*Assistant Examiner* — Paul F Payer
(74) *Attorney, Agent, or Firm* — Staas & Halsey LLP

(57) ABSTRACT

A network print system having plural terminal devices connected to one another through a network, including a first terminal device to create and send print data to the network, a second terminal device connected to the network, and a first network printer to notify the second terminal device of a reception of the print data if the print data is received through the network, and to adjust a number of copies to be printed for the print data if additional printouts of the print data are requested from the second terminal device. Thus, the present invention enables other users to share the print data in a simple manner.

18 Claims, 7 Drawing Sheets

NETWORK PRINTER ADJUSTING THE NUMBER OF COPIES ON REQUEST FOR ADDITIONAL PRINTOUT AND NETWORK PRINT SYSTEM USING THE SAME

CROSS-REFERENCE TO RELATED APPLICATION

This application claims the benefit of Korean Application No. 2005-7158, filed 2005-33409, in the Korean Intellectual Property Office, the disclosure of which is incorporated herein by reference.

BACKGROUND OF THE INVENTION

1. Field of the Invention

An aspect of the present invention relates to a network print system having network printers and a printing method, and, more particularly, to network printers to notify a terminal device of a printout if data to be printed (hereinafter, referred to as 'print data') is received, to ask whether an additional printout is requested, and to determine a number of copies to print depending on whether the additional printout is requested, a network print system using the same, and a print method.

2. Description of the Related Art

With recent developments of network technologies, network systems have spread up to general companies as well as to individual homes to connect plural terminal devices to one network. Such network systems enable diverse computer peripherals to be connected so that plural users may share the computer peripherals. Of the network systems, a typical network peripheral may be a network printer. The network printer has a built-in network interface card enabling print data to be received through a network.

However, systems built with network printers have had a problem in that other users have not been able to directly use print data created from one terminal device. That is, if the other users want to print out data created from a first terminal device, they must either directly print out the data at the first terminal device or ask the user of the first terminal device to print out the data, which causes inconvenience.

Further, in conventional systems, if there is provided a different network printer located nearer to the other users than a network printer for the first terminal device even though the other users can do additional printout jobs at the first terminal device as desired, the other users may feel more convenient with the different network printer nearer to them. However, the conventional network print system does not provide such an option.

Further, users who intend to use print data may use a method of receiving the print data by using a file server or electronic mails. However, such a method needs procedures such as uploading and downloading files, so users still undergo inconvenience. In addition, such a method has a problem of difficulties in security.

SUMMARY OF THE INVENTION

An aspect of the present invention is to provide network printers, a network print system using the same, and a method therefor, capable of eliminating users' inconvenience and maintaining security by notifying other terminal devices of certain data printouts and performing additional printouts if there exist requests for the additional printouts from the other terminal devices.

Another aspect of the present invention is to provide network printers, a network print system using the same, and a method therefor, capable of improving users' convenience by transferring print data to a different network printer that users want.

The foregoing and/or other aspects and advantages are substantially realized by providing A network print system having plural terminal devices connected to one another through a network, comprising a first terminal device to create and send print data to the network; a second terminal device connected to the network; and a first network printer to notify the second terminal device of a reception of the print data if the print data is received through the network, and to adjust a number of copies to be printed for the print data if additional printouts of the print data are requested from the second terminal device.

In an embodiment of the invention, the network print system further comprises a second network printer connected to the network, wherein, if the second terminal device sends a print data transfer request packet designating the second network printer as a transfer destination, the first network printer sends the print data to the second network printer.

In an embodiment of the invention, if a print command for a certain document is inputted, the first terminal device runs a predetermined printer driver program to display a user interface window capable of activating an operation of notifying a user of the second terminal device of the document printout.

In an embodiment of the invention, the first terminal device sends at least one of a piece of information of a printout option to decide whether to allow the additional printout, a device designation option to designate the second terminal device of the plural terminal devices, and a description of the print data to the first network printer.

Here, the first network printer selects a terminal device designated according to the device designation option as the second terminal device, sends at least one of a piece of information on a user of the first terminal device and information of print data file name, a number of pages for a document to be printed, and a description on the print data to the second terminal device, and asks the second terminal device for additional printout for the print data.

In an embodiment of the invention, the second terminal device displays on a screen thereof a user interface window containing at least one of a first area to display information sent from the first network printer, a second area to ask for additional printouts of the print data, and a third area to set a number of additional copies for the print data.

Here, if a command for additionally printing the print data by the number of additional copies is inputted through the user interface window, the second terminal device sends an additional printout request packet to request for additional printout by the number of copies that is set to the first network printer.

In an embodiment of the invention, the first network printer sets a certain response-waiting time period, and decides the number of copies by reflecting the number of additional copies requested according to the additional printout request packet received for the response-waiting time period.

Here, if the additional printout request packet is not received for the response-waiting time period, the first network printer performs print tasks according to the number of copies specified by the first terminal device.

The foregoing and/or other aspects and advantages are substantially realized by providing a network printer to receive print data from one terminal device, acting as a first terminal device, of plural terminal devices connected to a network and to perform print tasks according to the print data, comprising a communication unit to perform data communications through the network; a search unit to select a terminal device of the plural terminal devices as a second terminal device, if the print data is received through the communication unit; a printer control unit to control the communication unit to notify the second terminal device of a reception of the print data; a number-of-copies decision unit to adjust the number of copies for the print data if an additional printout for the print data is requested from the second terminal device; and a print unit to print the print data by the number of copies adjusted by the number-of-copies decision unit according to the control of the printer control unit.

In an embodiment of the invention, the search unit selects a terminal device designated according to the device designation information recorded in a header portion of the print data as the second terminal device.

In an embodiment of the invention, if the device designation information designating a certain device of the plural terminal devices is separately sent from the first terminal device, the search unit selects the device designated according to the device designation information as the second terminal device.

In an embodiment of the invention, the number-of-copies decision unit adjusts the number of copies according to the number of additional copies requested by the second terminal device during a certain response-waiting time period.

In an embodiment of the invention, the printer control unit sends at least one of a piece of user information and information on print data file name, a number of pages of a document to be printed, and a description recorded in a header portion of the print data to the second terminal device, and asks whether to perform additional printouts for the print data.

Here, if the printer control unit receives from the second terminal device a print data transfer request packet designating the second network printer as a transfer destination, the printer control unit controls the communication unit to send the print data to the second network printer.

The foregoing and/or other aspects and advantages are substantially realized by providing a print method to be used with a network printer connected to plural terminal devices through a network, comprising receiving print data generated from a first terminal device of the plural terminal devices; selecting a second terminal device of the plural terminal devices: notifying the second terminal device of a reception of the print data and asking whether to perform additional printouts for the print data; and adjusting a number of copies of the print data according to an additional printout request if an additional printout of the print data is requested from the second terminal device.

In an embodiment of the invention, the print method further comprises sending the print data to the second network printer, if a print data transfer request packet designating the second network printer as a transfer destination is received from the second terminal device.

In an embodiment of the invention, the selecting selects a terminal device designated according to device designation information recorded in a header portion of the print data as the second terminal device.

In an embodiment of the invention, the selecting selects a device designated according to device designation information as the second terminal device if the device designation information designating a certain device of the plural terminal devices is separately sent from the first terminal device.

In an embodiment of the invention, the notifying includes sending at least one of a piece of information of a user of the first terminal device, a print data file name, a number of pages of a document to be printed, and a description on the print data to the second terminal device.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which: The above aspects and features of the present invention will be more apparent by describing certain embodiments of the present invention with reference to the accompanying drawings, in which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
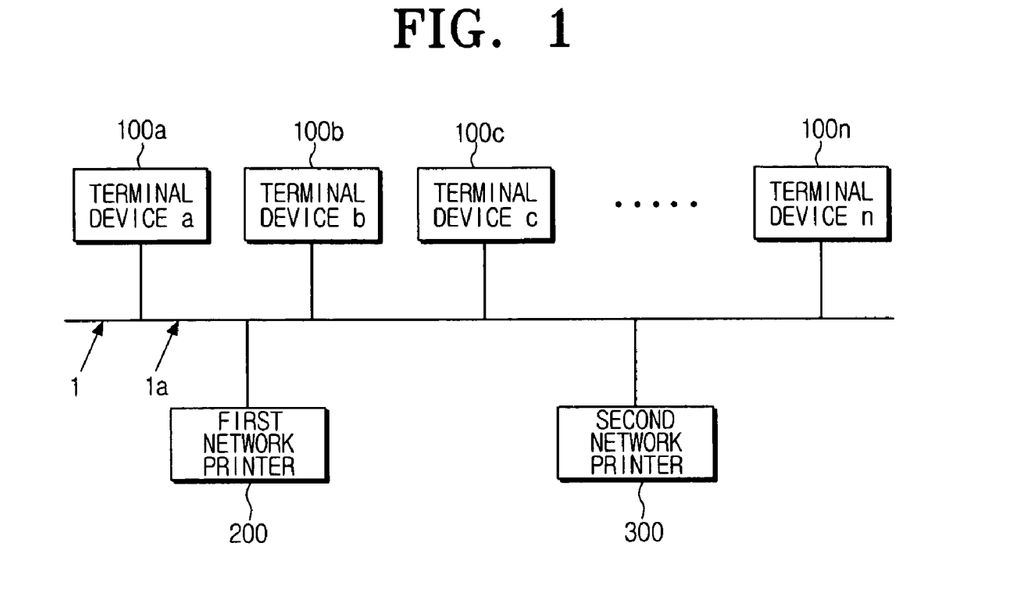
FIG. 1 is a block diagram to show a structure of a network print system according to an embodiment of the present invention.

FIG. 1 is a block diagram to show a structure of a network print system 1 according to an embodiment of the present invention. In FIG. 1, the network print system 1 comprises plural terminal devices 100a to 100n, and first and second network printers 200 and 300. FIG. 1 shows the two network printers 200 and 300, of which one or both be used at any time. Here, the terminal devices 100a to 100n may be desktop PCs, notebook PCs, PDAs, and other similar electronic devices.

Users of the terminal devices 100a to 100n may each use diverse application programs to create a document and input a print command. Operations of the network print system 1 will be described with reference to an example in which, of the terminal devices 100a to 100n, the terminal device 100a designates and issues a print command to the first network printer 200.

If a user inputs a print command to print a certain document to the terminal device 100a, the terminal device 100a converts the document into a printer readable language that the first network printer 200 recognizes, and creates print data. The created print data is sent to the first network printer 200 through a network 1a.

The first network printer 200 selects at least one terminal device of the other terminal devices 100b to 100n on the network (hereinafter, a terminal device sending print data is referred to as the first terminal device, and a terminal device that the first network printer 200 selects is referred to as the "second terminal device"). The first network printer 200 then creates a message packet notifying that the first terminal device 100a is in printout, and sends the message packet to the selected second terminal device. Here, the first network printer 200 sends information identifying a print data sender, that is, information of a user of the first terminal device 100a, a file name for the print data, a number of pages of a document to be printed out, and other printing information, to the second terminal device. Further, the user of the first terminal device 100a may directly send information of a certain description that is inputted by the user to the second terminal device.

Here, it is assumed that the terminal devices 100b and 100c are selected as the second terminal devices. Therefore, in accordance with the discussion above, the first network printer 200 sends the above-described information to the terminal devices 100b and 100c, and asks a user whether to do additional printouts.

The terminal devices 100b and 100c each display on the screen the information sent from the first network printer 200. Further, the terminal devices 100b and 100c each display on the screen a user interface window to ask respective users of the terminal devices 100b and 110c whether to do additional printouts. Thus, if these users ask for the additional printouts on the user interface window, a certain additional printout packet is created and sent to the first network printer 200. These users may also set the number of additional copies, and send an additional printout request packet containing the number of additional copies.

If the additional printout request packet is received from the terminal devices 100b and 100c, the first network printer 200 adjusts the number of copies. That is, if the terminal device 100b requests one more copy and the terminal device 100c requests two more copies, where the first terminal device 100a is initially set to one copy as the number of copies, the first network printer 200 adjusts the number of copies to four copies. Further, if a predetermined response-waiting time period lapses from the time of the notifying of the printout, the first network printer 200 does not receive any further additional printout requests, but determines the number of copies. The response-waiting time period may be a default time stored in the firmware of the first network printer 200, or, alternately, the user may set a certain time period for his or her convenience.

Further, if the notifying of the printout is effected and the second network printer 300 is found to be located nearer to the terminal devices 100b and 100c than to the first network printer 200, the users of the second terminal devices 100b and 100c may designate the second network printer 300 as a destination, and may ask for a print data transfer. If a print data transfer request packet is sent from either of the second terminal devices 100b and 100c, the first network printer 200 sends the above-described print data to a printer designated by the transfer request packet, that is, to the second network printer 300. Therefore, the users may direct that a document be printed at a position near to him or herself.

Figure 2:
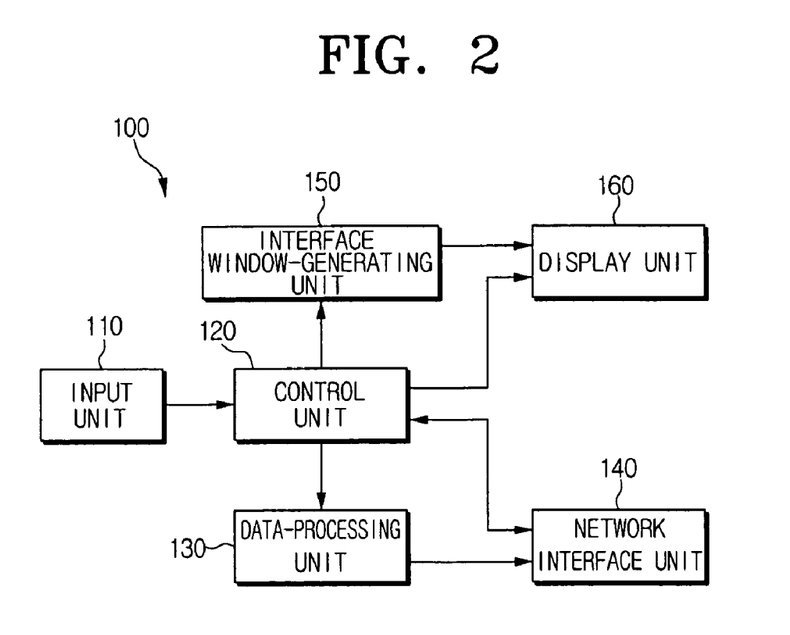
FIG. 2 is a block diagram to show a structure of a terminal device according to an embodiment of the present invention.

FIG. 2 is a block diagram to show a structure of the terminal device 100 according to an embodiment of the present invention. As shown in FIG. 2, the terminal device 100 has an input unit 110, a control unit 120, a data-processing unit 130, a network interface unit 140, an interface window-generating unit 150, and a display unit 160.

The present terminal device 100 serves as either the first terminal device or as the second terminal device. First, a description will be made on operations of the respective units as above under the assumption that the terminal device 100 serves as the first terminal device.

The input unit 110 recognizes an input signal that a user inputs, and notifies the control unit 120 of the input signal. The user may input a print command through the input unit 110. The interface window-generating unit 150 generates a user interface window to enable a user to set printout options. The display unit 160 displays a generated user interface window on the screen. If a print command for a certain document is inputted, the control unit 120 controls the interface window-generating unit 150 and the display unit 160 to display a user interface window on the screen.

Of the diverse printout options displayed on the user interface window, the user may activate a printout notification operation enabling notification to another terminal device of printouts for additional printouts.

The data-processing unit 130 converts the document to be printed out with a print command into a printer language that the first network printer 200 recognizes, thereby creating print data. Here, the header portion of the print data contains information on printout options that the user sets. In detail, if the printout notification operation is activated, the data-processing unit 130 sets the bit value of a field to "1" corresponding to the printout notification operation that the header portion of the print data contains.

Here, the terminal device 100 directly designates the second terminal device. Further, a user may input a description of a feature of a document to be printed. The data-processing unit 130 records device designation information designating the second terminal device, the description, and other information, in the header portion of the print data. As such, the header portion of print data requires a field to record data to designate the second terminal device, a field to record the description, and other similar fields.

The print data, created from the data-processing unit 130, is sent to the first network printer 200 through the network interface unit 140.

Figure 3:
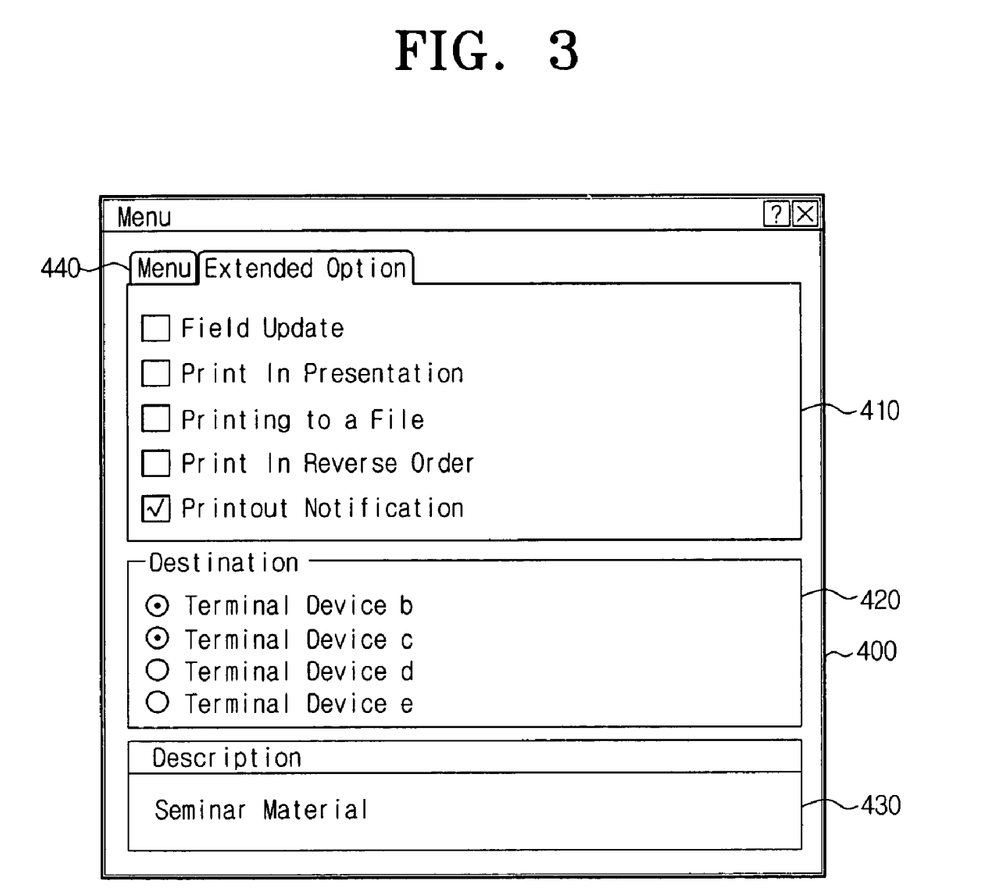
FIG. 3 is a view to illustrate a configuration of a user interface window displayed on the screen of a first terminal device generating print data.

FIG. 3 is a view to illustrate a configuration of a user interface window 400 displayed on the screen when a print command is inputted if the present terminal device 100 serves as the first terminal device. In FIG. 3, the user interface window 400 is configured with a menu area 440 in which normal printout options are selected, a first area 410 to support extended printout option settings, a second area 420 to support notification recipient selections, and a third area 430 to support a notification message.

The first area 410 displays diverse options that may be set. Of the options, if a user selects "printout notification", the second and third areas 420 and 430 are displayed. The user selects the second terminal device on the second area 420, and then directly inputs on the third area 430 the description on a document to be printed.

If the user selects the print button 400 in such a state, the data-processing unit 130 generates print data including information on the selected second terminal device and inputted description.

Further, the "printout notification" operation may be directly activated in advance in the first network printer 200 itself. That is, by running a predetermined management program to manage the first network printer 200 in the first network printer 200, a user may set the printout options. Further, the user may designate the second terminal device in the management program. The first network printer 200 stores in a memory thereof the printout options set by the management program and the information on the designated second terminal device. Thus, every time the print data is sent from the terminal device 100, the first network printer 200 automatically notifies the designated second terminal device.

Next, a description will be made on the occasion the present terminal device 100 serves as the second terminal device.

The network interface unit 140 receives the information sent from the first network printer 200. If the control unit 120 inputs the information, the control unit 120 controls the interface window-generating unit 150 to generate a user interface window displaying the received information. The generated user interface window is displayed on the screen by the display unit 160.

Figure 4:
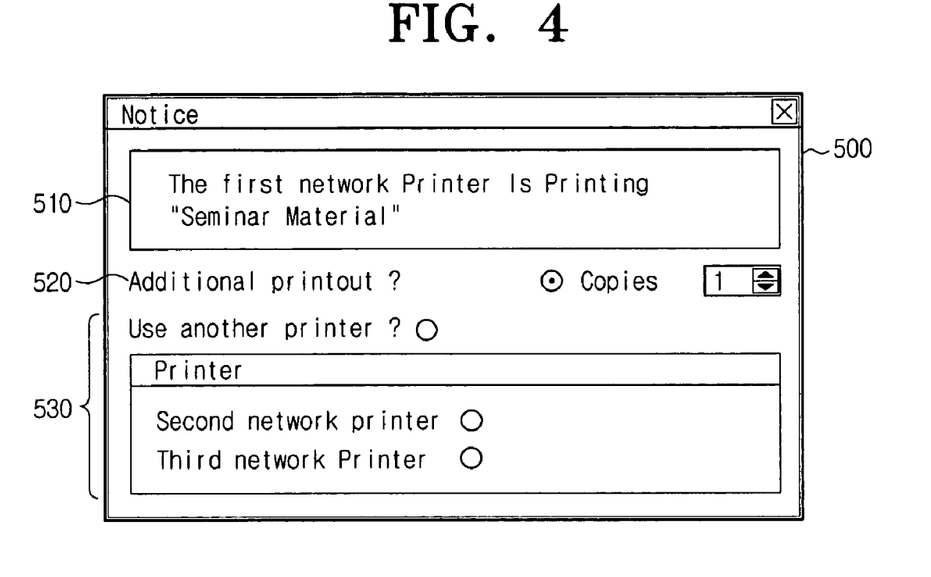
FIG. 4 is a view to illustrate a configuration of a user interface window displayed on the screen of a second terminal device capable of requesting additional printouts.

FIG. 4 is a view to illustrate a configuration of a user interface window displayed on the screen when the terminal device 100 serves as the second terminal device. The user interface window 500, shown in FIG. 4, contains a first area 510 to display information sent from the first network printer 200, a second area 520 to ask whether to do additional printouts, and a third area 530 to ask whether to change printers for printouts.

The first area 510 of FIG. 4 shows that a printer currently performing print jobs is the first network printer 200. Further, it may be seen that the document being printed is "seminar material". In the present embodiment, the first area 510 may display information on a document creator, a file name of print data, the number of pages, and other information.

Further, the second area 520 provides space for a user to select the number of copies for an additional printout. If the user selects the option of the additional printout, a space for a selection of a number of copies for the additional printout is activated. The user may then input a number in the activated space to select the number of additional copies.

Further, the third area 530 displays options to ask whether to change printers for printouts. If a user selects one of the displayed options, a space for a selection of a printer for use is activated. The user may then designate a printer located nearest to him or herself by using the activated space.

The control unit 120 generates the additional printout request packet or the print data transfer request packet corresponding to the selected option through the user interface window 500. Thus, the control unit 120 sends the generated packet to the first network printer 200 through the network interface unit 140. The first network printer 200 additionally prints data according to the received packet, or performs operations of sending the data to another network printer.

The user interface window 500 may further display an area (not shown) for adjusting a characteristic of printing data. Accordingly, when the user adjust the characteristic of the print data using the user interface window 500, the control unit 120 transmits the adjusted characteristic data to the first network printer 200 through a network interface unit 140 so that additional printing can be performed according to the adjusted characteristic. The printing characteristic may comprise font, printing direction, and margins in the printing paper.

Figure 5:
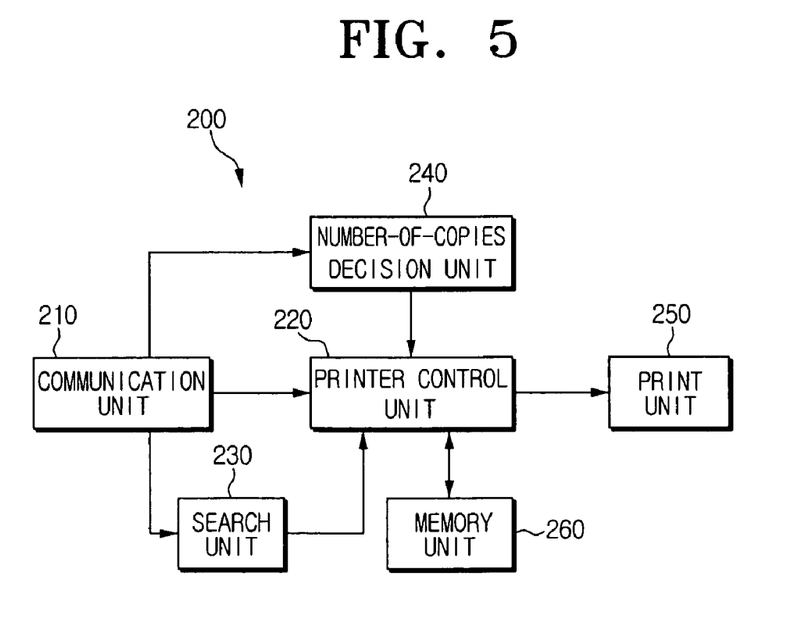
FIG. 5 is a block diagram to show a structure of a network printer according to an embodiment of the present invention.

FIG. 5 is a block diagram to show a structure of the first network printer 200 according to an embodiment of the present invention. As shown in FIG. 5, the first network printer 200 comprises a communication unit 210, a printer control unit 220, a search unit 230, a number-of-copies decision unit 240, a print unit 250, and a memory unit 260.

The communication unit 210 performs communications with the plural terminal devices 100a to 100n through the network. To do this, the communication unit 210 has a network interface card (not shown). The printer control unit 220 identifies data received through the communication unit 210, and performs controls according to the data. That is, if received with the print data and a print command, the printer control unit 220 stores the received print data in the memory unit 260, and controls the print unit 250 to perform print tasks. Further, if the management program runs in the first terminal device and printout options are set, the printer control unit 220 stores the information on the set printout options in the memory unit 260. In detail, the printer control unit 220 sets and stores information of whether to activate the option of "printout notification," information on the second terminal device to notify of printouts, information of a notification message, and other information in advance in the memory unit 260.

The print unit 250 substantially prints data out on sheets of paper. In the laser printer, the print unit 250 may comprise a charging unit, a developing unit, an optical photo conductor, a Laser Scanning Unit (LSU), a transfer unit, a fusing unit, and other features.

Further, the printer control unit 220 checks the header portion of the received print data to decide whether the option of "printout notification" is activated. That is, the printer control unit 220 decides that the option of "printout notification" is activated if the header portion has a bit value of "1" stored in a field corresponding to the option, and decides that the option is deactivated if the header portion has a bit value of "0." In other cases, if the memory unit 260 stores the fact that the first terminal device has activated the option of "printout notification" in advance, the printer control unit 220 performs a corresponding operation with no other sign in the header portion of the print data.

The search unit 230 selects the second terminal device. In detail, if the header portion of the print data designates a certain terminal device, the search unit 230 selects the designated terminal device as the second terminal device. Otherwise, the search unit 230 selects the second terminal device by checking information of the second terminal device designated by the first terminal device and stored in the memory unit 260.

The search unit 230 notifies the printer control unit 220 of the information of the selected second terminal device. The printer control unit 220 controls the communication unit 210 to generate a message packet notifying that print tasks are currently performed. The communication unit 210 sends the generated message packet to the second terminal device. Here, a description inputted by a user of the first terminal device may be generated as a message packet. The printer control unit 220 also checks if an additional printout request packet or a print data transfer request packet is received for a predetermined response-waiting time period.

The number-of-copies decision unit 240 adjusts the number of copies to be printed according to the number of copies requested in the additional printout request packet. That is, the number of total copies is decided by adding the number of additional copies to the number of copies set by the first terminal device. Once the number of total copies is decided, the printer control unit 220 controls the print unit 250 to perform print tasks up to the number of total copies.

Further, if the data transfer request packet is received, the printer control unit 220 sends the print data that is stored in the memory unit 260 to the second protection package 200 designated in the data transfer request packet.

Figure 6:
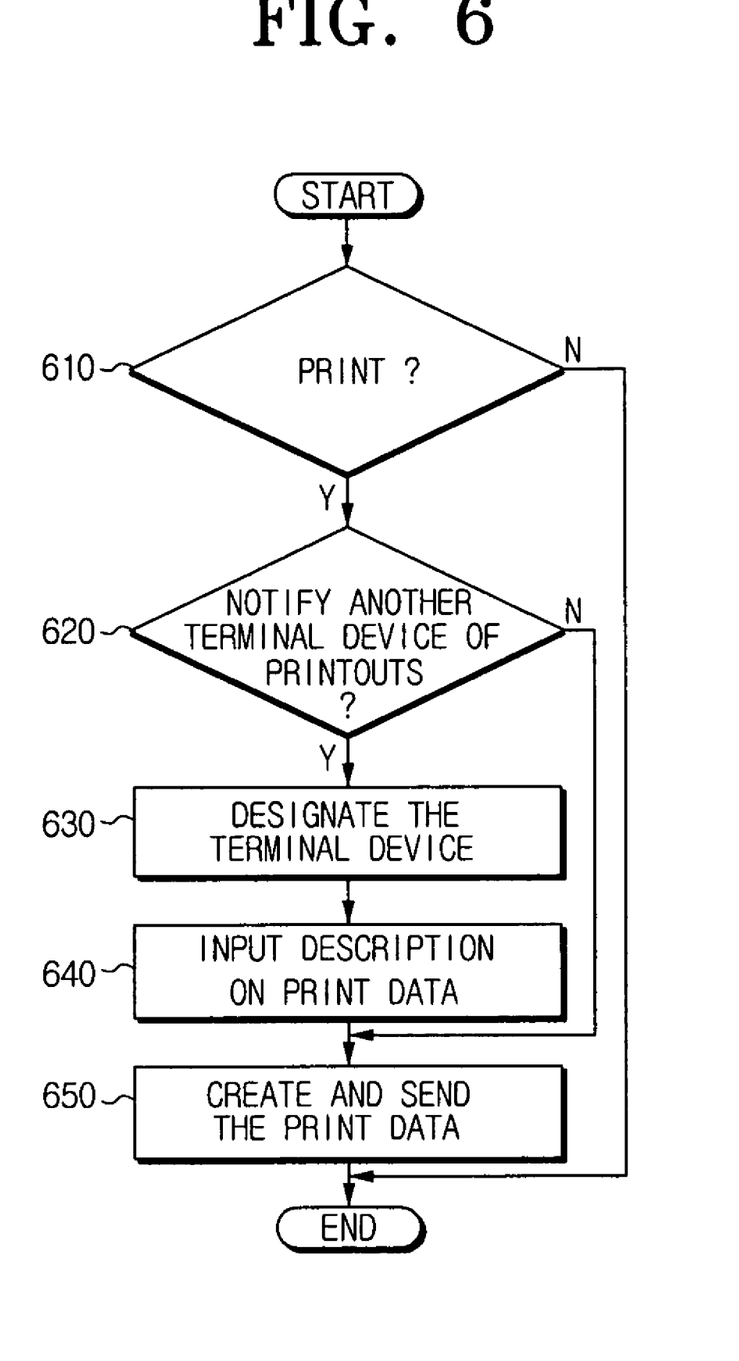
FIG. 6 is a flow chart to explain a process of the first terminal device for generating print data.

FIG. 6 is a flow chart to explain a processing method in the first terminal device constructing the present network print system. As shown in FIG. 6, if a print command is inputted (610), the first terminal device runs a printer driver program to display a user interface window on the screen. A user may set various options on the user interface window. If the user selects the option of notifying a user of at least one second terminal device with printout notification on the user interface window (620), the user interface window provides an opportunity enabling the user of the at least one second terminal device to designate the second terminal device (630). Further, the user interface window enables the user of the at least one second terminal device to directly input a notification message (640). Therefore, if the options are completely set, print data is created that has a header portion containing the set information, and is sent to the first network printer (650).

Figure 7:
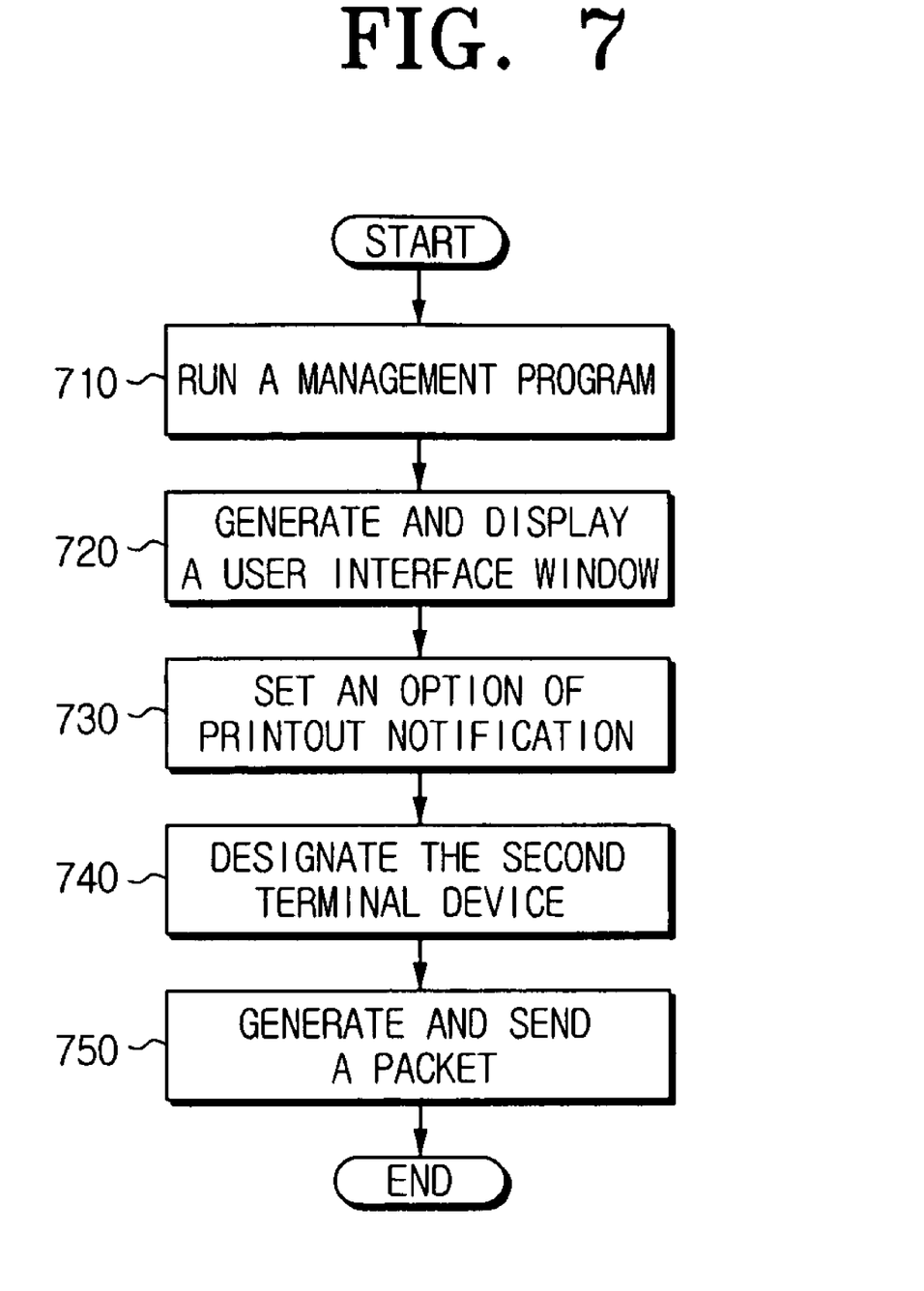
FIG. 7 is a flow chart to explain a method for configuring environments of the first terminal device for additional data printouts.

FIG. 7 is a flow chart to explain a method of setting printout options by using a certain management program enabling the first terminal device to directly manage a network printer. As shown in FIG. 7, if the management program runs (710), a predetermined user interface window is generated and displayed on a screen (720). Thus, a user sets the option of printout notification (730), and designates the second terminal device (740). Further, the user may input in advance a message to be sent, but, in an embodiment of the invention, the user changes the message every time printing occurs since documents may be different during each printing operation. Thus, if the printout options are completely set, a general data packet is generated that has the set option information as a packet body, and is sent to the first network printer (750).

Figure 8:
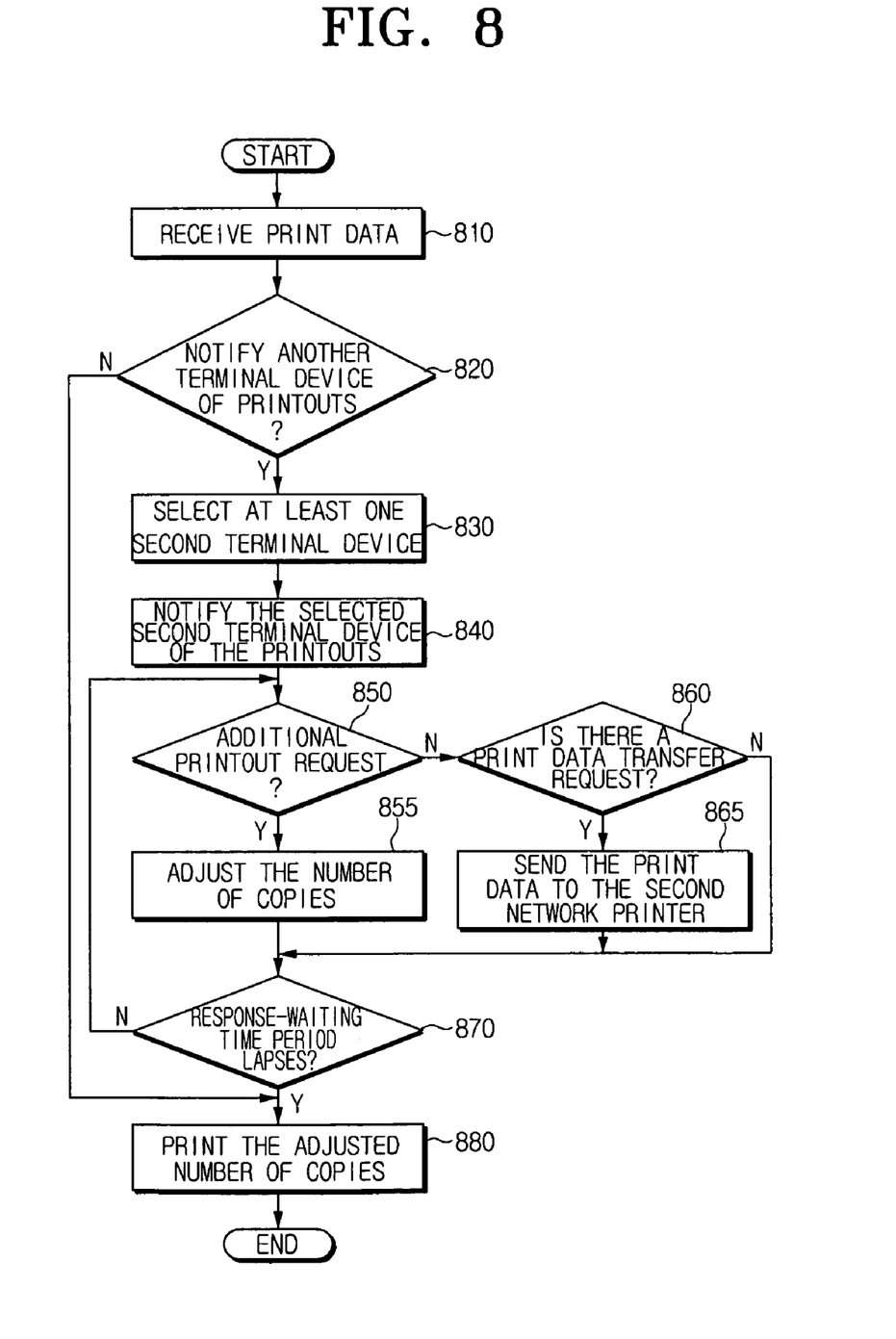
FIG. 8 is a flow chart to explain a print method for the network printer according to an embodiment of the present invention.

FIG. 8 is a flow chart to explain a printout method for the first network printer constructing the present network print system. As shown in FIG. 8, if print data is received (810), whether to notify the other terminal devices of the printout is determined depending on the option settings (820).

Thus, if the option of notification of the printout is determined to be chosen, the second terminal device is selected as a notification recipient (830). As above, a terminal device that a user has designated upon creating print data or in advance may be selected as the second terminal device. The first network printer notifies the selected second terminal device of the printout (840).

The first network printer checks if an additional printout request is received from the second terminal device (850). In an embodiment of the invention, the first network printer sets a certain response-waiting time period in order that the total print time may be reduced, and decides that only the requests received for the time period are validated. Thus, the first network printer adjusts the number of total copies in the manner of increasing the number of copies by the number of copies requested according to the additional printout requests (855).

Further, if a data transfer request is received from the second terminal device within the response-waiting time period (860), the first network printer sends the print data to the second network printer 300 according to the data transfer request (865). As a result, if the response-waiting time period lapses (870), the first network printer performs print tasks by the number of copies that is finally decided (880).

Figure 9:
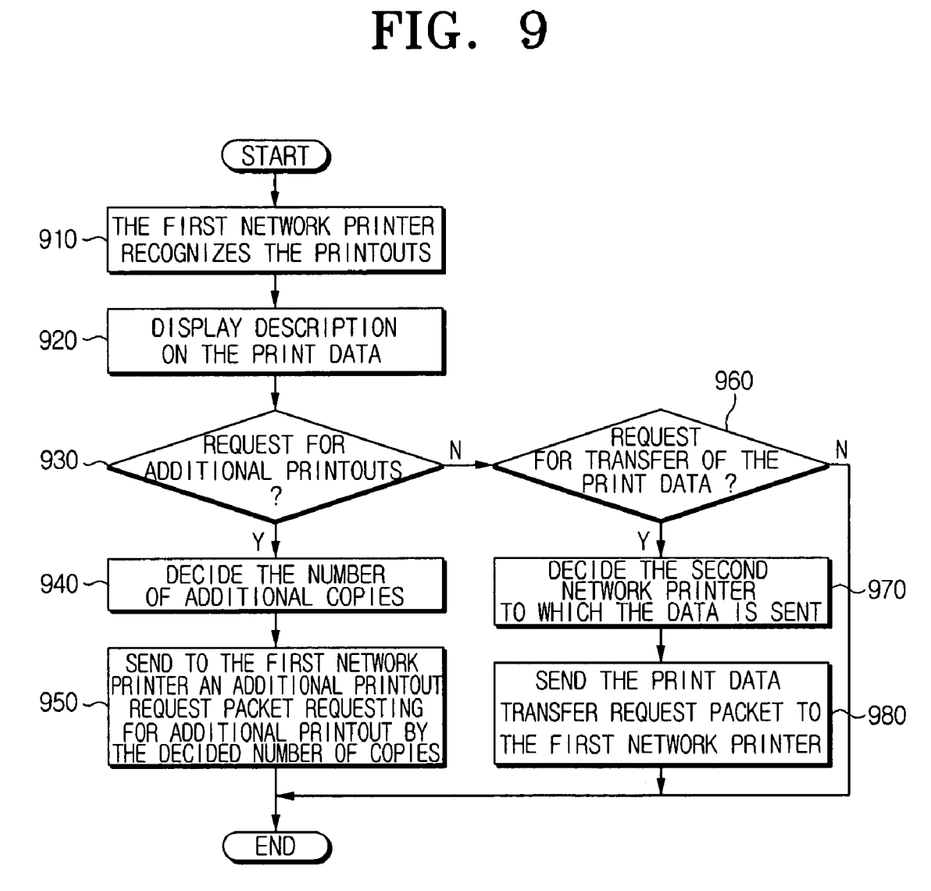
FIG. 9 is a flow chart to explain a method of requesting for additional data printouts at the second terminal device.

FIG. 9 is a flow chart to explain a process of the second terminal device, which is notified of the printout, of the present network print system. As shown in FIG. 9, if the first network printer notifies of the printout by sending information (910), the second terminal device displays the sent information on the corresponding screen (920) to be displayed on a predetermined user interface window. The user interface window may further display an additional printout request area, an additional number-of-copies determination area, and other information. Thus, if the user requests an additional printout (930) and decides the number of additional copies (940), the second terminal device sends the first network printer 100 an additional printout request packet requesting additional printouts up to the number of copies (950) that is finally decided.

Further, the user interface window further displays a data transfer request area to send print data, a printer designation area to designate a destination to which the data is sent, and other information. Thus, if a user asks for a print data transfer (960) and decides the second network printer 200 as a destination (970), the print data transfer request packet containing the information on the second network printer 200 is sent to the first network printer 100 (980). The user may designate as the second network printer a printer located conveniently for him or herself.

As is stated above, since the present invention designates and notifies other users of printouts, the present invention performs additional print tasks according to requests if the notified users request the additional print tasks, using their own terminal device. As a result, the present invention enables the other users to share print data in a simple way. Further, since the notified users may request a transfer of the print data to a printer located convenient to them, the present invention enables a different printer to perform printout tasks. Thus, the present invention may greatly improve users' convenience.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A network print system having plural terminal devices connected to one another through a network, comprising:
    a first terminal device to create and send print data and a print command to the network;
    a second terminal device connected to the network; and
    a first network printer to transmit a message packet regarding a print job of the print data to the second terminal device of a reception of the print data to ask whether to perform additional printouts for the print data if the print data and the print command are received through the network, and to adjust a number of copies to be printed for the print data if additional printouts of the print data are requested from the second terminal device,
    wherein the message packet comprises at least one of a piece of user information and information on a print data file name, a number of pages of a document to be printed, and a description recorded in a header portion of the print data and if a device designation information designating a certain device of the plural terminal devices is separately sent from the first terminal device, a search unit selects the device designated according to the device designation information as the second terminal device,
    wherein, if the print command for a certain document is inputted, the first terminal device runs a predetermined printer driver program to display a user interface window capable of activating an operation of notifying a user of the second terminal device of the document printout.

2. The network print system as claimed in claim 1, further comprising a second network printer connected to the network, wherein, if the second terminal device sends a print data transfer request packet designating the second network printer as a transfer destination, the first network printer sends the print data to the second network printer.

3. The network print system as claimed in claim 1, wherein the first terminal device sends at least one of printout option information to decide whether to allow the additional printout, a device designation information to designate the second terminal device of the plural terminal devices, and a description of the print data to the first network printer.

4. The network print system as claimed in claim 3, wherein the first network printer selects a terminal device designated according to the device designation information as the second terminal device and the message packet comprises at least one of information on a user of the first terminal device and information of print data file name, a number of pages for a document to be printed, and a description of the print data to the second terminal device.

5. The network print system as claimed in claim 4, wherein the second terminal device displays on a screen thereof a user interface window containing at least one of a first area to display information sent from the first network printer, a second area to ask for additional printouts of the print data, and a third area to set a number of additional copies for the print data.

6. The network print system as claimed in claim 5, wherein, if a command for additionally printing the print data by the number of additional copies is inputted through the user interface window, the second terminal device sends an additional printout request packet to request an additional printout by the number of additional copies that is set to the first network printer.

7. The network print system as claimed in claim 6, wherein the first network printer sets a certain response-waiting time period, and determines a number of copies to be printed based on the number of additional copies requested according to the additional printout request packet and any other printout request packet received during the response-waiting time period.

8. The network print system as claimed in claim 7, wherein, if the additional printout request packet is not received for the response-waiting time period, the first network printer performs print tasks according to the number of copies specified by the first terminal device.

9. The network print system as claimed in claim 1, wherein the second terminal device comprises a plurality of second terminal devices.

10. A network printer to receive print data from one terminal device, acting as a first terminal device, of plural terminal devices connected to a network and to perform print tasks according to the print data, comprising:
a communication unit to perform data communications through the network;
a search unit to select a terminal device of the plural terminal devices as a second terminal device, if the print data and a print command are received through the communication unit;
a printer control unit to control the communication unit to transmit a message packet regarding a print job of the print data to the second terminal device to ask whether to perform additional printouts for the print data;
a number-of-copies decision unit to adjust the number of copies for the print data if an additional printout for the print data is requested from the second terminal device; and
a print unit to print the print data by the number of copies adjusted by the number-of-copies decision unit according to the control of the printer control unit,
wherein the message packet comprises at least one of a piece of user information and information on a print data file name, a number of pages of a document to be printed, and a description recorded in a header portion of the print data and if the device designation information designating a certain device of the plural terminal devices is separately sent from the first terminal device, the search unit selects the device designated according to the device designation information as the second terminal device,
wherein, if the print command for a certain document is inputted, the first terminal device runs a predetermined printer driver program to display a user interface window capable of activating an operation of notifying a user of the second terminal device of the document printout.

11. The network printer as claimed in claim 10, wherein the search unit selects a terminal device designated according to the device designation information recorded in a header portion of the print data as the second terminal device.

12. The network printer as claimed in claim 10, wherein the number-of-copies decision unit adjusts the number of copies according to the number of additional copies requested by the second terminal device during a certain response-waiting time period.

13. The network printer as claimed in claim 10, wherein, if the printer control unit receives a print data transfer request packet designating the second network printer as a transfer destination, the printer control unit controls the communication unit to send the print data to the second network printer from the second terminal device.

14. The network printer as claimed in claim 10, wherein the second terminal device comprises a plurality of second terminal devices.

15. A print method to be used with a network printer connected to plural terminal devices through a network, comprising:
receiving print data and a print command generated from a first terminal device of the plural terminal devices;
selecting a second terminal device of the plural terminal devices:
transmitting a message packet regarding to a print job of the print data to the second terminal device to ask whether to perform additional printouts for the print data; and
adjusting a number of copies of the print data according to an additional printout request if an additional printout of the print data is requested from the second terminal device;
designating the second network printer as a transfer destination; and
sending the print data to the second network printer, if a print data transfer request packet is received from the second terminal device,
wherein the message packet comprises at least one of a piece of user information and information on a print data file name, a number of pages of a document to be printed, and a description recorded in a header portion of the print data, and the selecting comprises selecting a device designated according to device designation information as the second terminal device if the device designation information designating a certain device of the plural terminal devices is separately sent from the first terminal device, wherein, if the print command for a certain document is inputted, the first terminal device runs a predetermined printer driver program to display a user interface window capable of activating an operation of notifying a user of the second terminal device of the document printout.

16. The print method as claimed in claim 15, wherein the selecting comprises selecting a terminal device designated according to device designation information recorded in a header portion of the print data as the second terminal device.

17. The print method as claimed in claim 15, wherein the message packet comprises sending at least one of a piece of information of a user of the first terminal device, the print data file name, the number of pages of a document to be printed, and the description of the print data.

18. The print method as claimed in claim 15, wherein the selecting of the second terminal device comprises selecting a plurality of second terminal devices.

* * * * *

UNITED STATES PATENT AND TRADEMARK OFFICE
CERTIFICATE OF CORRECTION

Page 1 of 1

PATENT NO.      : 8,120,800 B2
APPLICATION NO. : 11/333338
DATED           : February 21, 2012
INVENTOR(S)     : Kim et al.

It is certified that error appears in the above-identified patent and that said Letters Patent is hereby corrected as shown below:

In the Specification

Column 1, Line 10, delete "2005-7158, filed 2005-33409," and insert -- 10-2005-0007158, filed Jan. 26, 2005, --, therefor.

In the Claims

Column 11, Line 16, in Claim 4, delete "device" and insert -- device, --, therefor.

Signed and Sealed this
Twenty-second Day of July, 2014

Michelle K. Lee
*Deputy Director of the United States Patent and Trademark Office*